(12) United States Patent
Sergeev et al.

(10) Patent No.: US 12,216,612 B2
(45) Date of Patent: Feb. 4, 2025

(54) SYSTEMS AND METHODS FOR UPDATING SELECT FILES IN AN IMAGE BACKUP

(71) Applicant: Acronis International GmbH, Schaffhausen (CH)

(72) Inventors: Alexey Sergeev, Moscow (RU); Vladimir Strogov, Moscow (RU); Serguei Beloussov, Costa del Sol (SG); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 73 days.

(21) Appl. No.: 17/120,572

(22) Filed: Dec. 14, 2020

(65) Prior Publication Data

US 2021/0248106 A1    Aug. 12, 2021

Related U.S. Application Data

(60) Provisional application No. 62/971,304, filed on Feb. 7, 2020.

(51) Int. Cl.
*G06F 16/11* (2019.01)
*G06F 11/14* (2006.01)
*G06F 16/178* (2019.01)

(52) U.S. Cl.
CPC ........ *G06F 16/128* (2019.01); *G06F 11/1448* (2013.01); *G06F 16/178* (2019.01)

(58) Field of Classification Search
CPC .. G06F 16/128; G06F 16/178; G06F 11/1448; G06F 11/1451
See application file for complete search history.

(56) References Cited

U.S. PATENT DOCUMENTS

| | | | | |
|---|---|---|---|---|
| 8,296,410 | B1 * | 10/2012 | Myhill | G06F 11/1464 709/223 |
| 8,473,461 | B1 * | 6/2013 | Woirhaye | G06F 21/10 707/640 |
| 8,706,694 | B2 * | 4/2014 | Chatterjee | G06F 16/10 707/640 |
| 8,732,121 | B1 * | 5/2014 | Zorin | G06F 16/113 707/640 |
| 8,924,360 | B1 * | 12/2014 | Caputo | G06F 11/1448 707/684 |
| 9,542,401 | B1 * | 1/2017 | Veeraswamy | G06F 16/128 |
| 9,569,124 | B2 * | 2/2017 | Jain | G06F 11/1448 |

(Continued)

*Primary Examiner* — Pierre M Vital
*Assistant Examiner* — Jedidiah P Ferrer
(74) *Attorney, Agent, or Firm* — ArentFox Schiff LLP; Michael Fainberg (57) ABSTRACT

Disclosed herein are systems and methods for updating select files in an image backup. In an exemplary aspect, a method comprises performing an image backup of a storage device comprising a plurality of files. The method comprises selecting a file of the plurality of files based on file selection rules and subsequent to the image backup, detecting that the file has exited a full consistency state. The method comprises monitoring the file to detect a return to the full consistency state. In response to detecting that the file has returned to the full consistency state, the method comprises identifying a physical address of at least one sector comprising the file on the storage device, and updating a version of the file previously captured in the image backup with a version of the file after returning to the full consistency state.

18 Claims, 3 Drawing Sheets

(56) References Cited

U.S. PATENT DOCUMENTS

| | | | |
|---|---|---|---|
| 2009/0271447 A1* | 10/2009 | Shin | G06F 16/182 |
| | | | 707/999.201 |
| 2013/0325810 A1* | 12/2013 | Elder | G06F 16/219 |
| | | | 707/645 |
| 2016/0127307 A1* | 5/2016 | Jain | G06F 16/148 |
| | | | 709/245 |
| 2016/0364301 A1* | 12/2016 | Alatorre | G06F 11/1448 |
| 2017/0090688 A1* | 3/2017 | Anderson | G06F 16/128 |
| 2018/0276085 A1* | 9/2018 | Mitkar | G06F 11/1451 |
| 2019/0212944 A1* | 7/2019 | Hutchison | G06F 11/1451 |
| 2019/0294505 A1* | 9/2019 | Hempelmann | G06F 11/1451 |
| 2019/0310995 A1* | 10/2019 | Jaquette | G06F 16/27 |

\* cited by examiner

SYSTEMS AND METHODS FOR UPDATING SELECT FILES IN AN IMAGE BACKUP

CROSS-REFERENCE TO RELATED APPLICATIONS

This application claims the benefit of U.S. Provisional Application No. 62/971,304, filed Feb. 7, 2020, which is herein incorporated by reference.

FIELD OF TECHNOLOGY

The present disclosure relates to the field of data backup using continuous data protection, and, more specifically, to systems and methods for updating select files in an image backup.

BACKGROUND

Standard and traditional data backup schemes usually work well, but need various improvements depending on the nature of the data that is being backed up. A conventional approach to backing up data involves performing a full image backup of system and user data, followed by incremental backups (i.e., only backing up data that has changed since the last backup was made between full backups). For example, in such a scheme, a full backup may be performed once a week and incremental backups may be performed daily.

This conventional approach, however, has several disadvantages. Firstly, even daily backups may be insufficient for important files and documents that change very often (e.g., many times during the day). Simply increasing the frequency of backups (even incremental ones) is very costly, however, because such backups take a lot of time, consume a lot of system resources, and require a lot of storage space.

Another problem associated with this kind of backup approach is that a user file can be opened for writing during the backup session. As a result, an inconsistent copy of this user file is stored in the backup (in "crash consistency state"). This may be especially true for applications that are not compatible with shadow copy generators such as the Volume Snapshot Service (VSS). Accordingly, the use of VSS snapshots for such applications is inefficient and a consistent copy of the file cannot be saved.

SUMMARY

To address these shortcomings, aspects of the disclosure describe methods and systems for updating select files in an image backup. In an exemplary aspect, a method comprises performing an image backup of a storage device comprising a plurality of files. The method comprises selecting a file of the plurality of files based on file selection rules. Subsequent to the image backup, the method comprises detecting that the file has exited a full consistency state, wherein the full consistency state is a state in which the file has remained unmodified for a given period of time. The method comprises monitoring the file to detect a return to the full consistency state. In response to detecting that the file has returned to the full consistency state, the method comprises identifying a physical address of at least one sector comprising the file on the storage device, and updating a version of the file previously captured in the image backup with a version of the file after returning to the full consistency state by copying contents of the at least one sector to a corresponding physical address of the image backup.

In some aspects, the image backup is either a full image backup or an incremental image backup.

In some aspects, the image backup is performed at a predetermined frequency and the image backup was performed at a first time. Subsequent to performing the image backup, the method comprises performing another image backup at a second time in accordance with the predetermined frequency. In response to determining that the file has not returned to the full consistency state while performing the another image backup, the method comprises not finalizing the another image backup, waiting for the file to return to the full consistency state, and finalizing the another image backup by copying the contents of the at least one sector to the corresponding physical address of the image backup subsequent to the file returning to the full consistency state.

In some aspects, monitoring the file to detect the return to the full consistency state further comprises halting subsequent image backups.

In some aspects, the file selection rules indicate a set of criteria comprising at least one of a minimum file size, a minimum number of access counts, a minimum number of dependencies, and a minimum number of state switches associated with a respective file that is to be selected.

In some aspects, the file exits and reenters the full consistency state multiple times subsequent to the image backup and prior to another image backup, wherein each version of the file is updated in the image backup and replaces a prior version of the file in the image backup.

In some aspects, the method comprises performing the another image backup of the storage device, wherein the another image backup comprises a subset of the plurality of files, determining whether a latest version of the file was created closer to the image backup or the another image backup, and in response to determining that the latest version of the file was created closer to the another image backup, including the latest version of the file in the another image backup.

In some aspects, in response to determining that the latest version of the file was created closer to the another image backup, the method comprises reverting the latest version of the file in the image backup to the version of the file previously captured in the image backup.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for updating select files in an image backup. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure provides a way of integrating image backups with continuous data protection (CDP) of selected (or predefined) files. By tracking selected files and performing backup at a time when the files are not used by a user, the need to take a snapshot of the entire system is eliminated. This integration is not possible in conventional CDP because conventional CDP is not compatible with images. It should be noted that an image backup is a process for generating a single file (known as an image) comprising a copy of the operating system (OS) and all data (e.g., system state and application configurations) associated with the OS for a computer or virtual machine (VM). This single file may use, for example, virtual hard disk v2 (VHDX) as its disk image file format for storing the complete contents of a hard disk. Continuous data protection (CDP) refers to automatically saving a copy of every change made to data on a computer, ultimately capturing every version of the data that the user saves.

Figure 1:
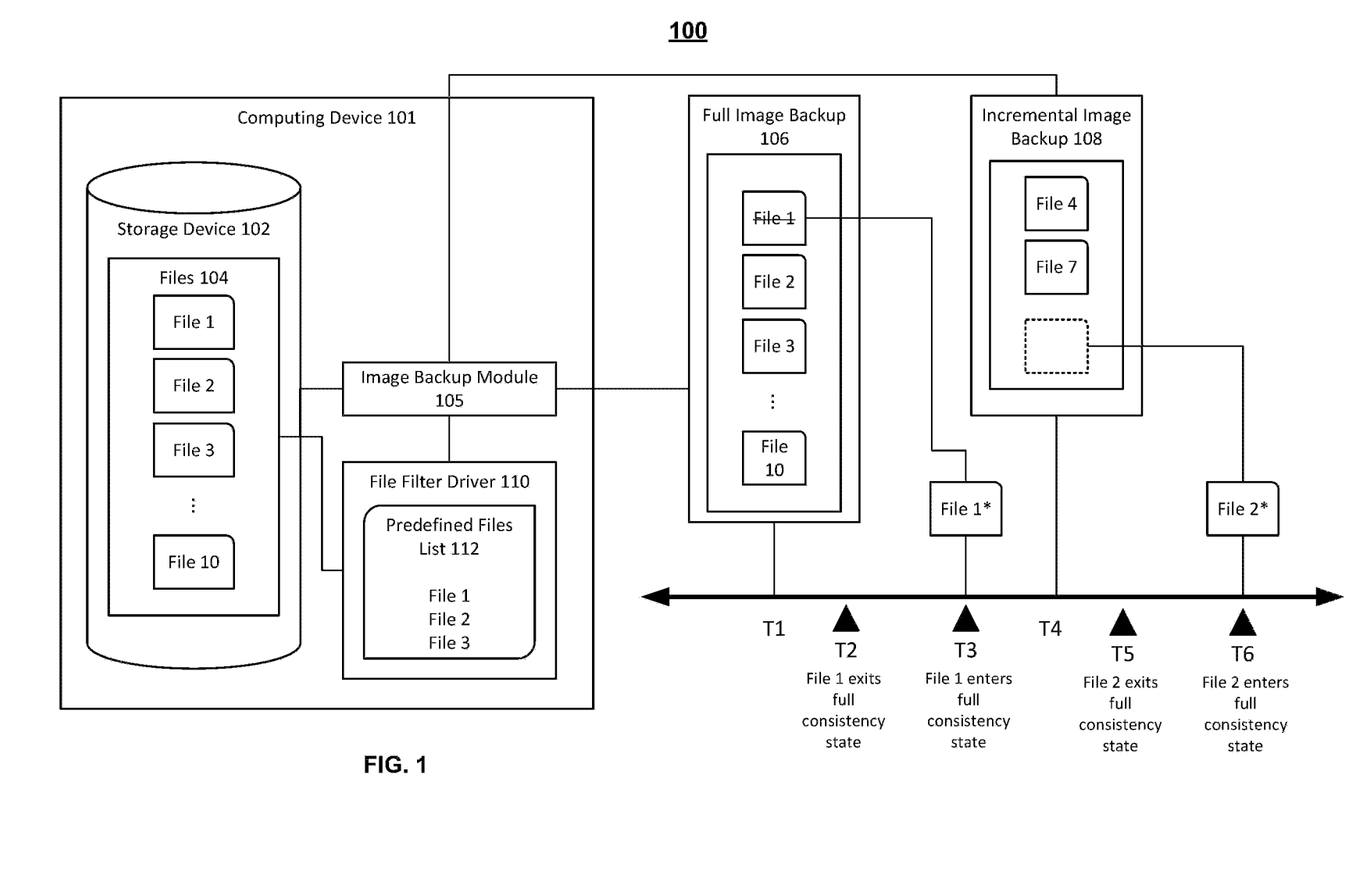
FIG. 1 is a block diagram illustrating a system for updating select files in an image backup, in accordance with aspects of the present disclosure.

FIG. 1 is a block diagram illustrating system 100 for updating select files in an image backup, in accordance with aspects of the present disclosure. System 100 comprises storage device 102 on which an operating system (OS), applications, a plurality of files 104, and other data exist. Storage device 102 may be a storage component of computing device 101 such as a computer, a server, a smartphone, etc. Image backup module 105 may perform a full image backup of storage device 102 according a full backup schedule (e.g., once every week). In some aspects, the full image backup 106 may be stored in a separate partition of storage device 102, on a remote server connected over the Internet, on a local device connected over a local access network, or any combination thereof. Image backup module 105 may reside on storage device 102 as a client-side application and may reside on the location where the full image backup 106 is stored (e.g., a remote server) as a server-side application. Image backup module 105 may also perform incremental backups 108 according to an incremental backup schedule (e.g., once every day). The incremental image backups 108 may also be stored in the same location as the full image backup 106.

As discussed previously, a user accessing storage device 102 may perform several modifications to certain files in the plurality of files 104. In some aspects, the frequency of file modification may be higher than the frequency of backup. For example, the incremental image backups 108 may be performed by module 105 on a daily basis, but a user may modify the plurality of files 104 several times during a single day. Under continuous data protection, a copy of each modification would be saved, but monitoring every file and performing image backups so frequently may be an intensive process that demands many resources.

To address these shortcomings, in exemplary aspects, file filter driver 110 is configured to update select files in full image backup 106 and incremental image backups 108. File filter driver 110 may be a module subcomponent of image backup module 105 or a standalone driver that resides on/has access to storage device 102. File filter driver 110 may select a file of the plurality of files 104 based on file selection rules. The file selection rules may indicate a set of criteria comprising at least one of a minimum file size, a minimum number of access counts, a minimum number of dependencies, and a minimum number of state switches (e.g., between full consistent and not fully consistent) associated with a respective file that is to be selected. For example, file filter driver 110 may evaluate whether a file of the plurality of files 104 has been accessed by the user five times per day. Because such a file is accessed frequently, file filter driver 110 may identify the file as one that should be continuously monitored for modifications. In another example, file filter driver 110 may determine whether a file has been modified at least two times in the past week. Here, because the file is frequently changed, it should be continuously monitored. In another example, file filter driver may determine whether at least X amount of files are dependent on a given file in order to work. Suppose that a user has a video file that is used in 10 presentation files (e.g., PowerPoint™). In order to run properly, the 10 presentation files depend on the video (i.e., require access to a latest version of the video file). Because of the given file (the video) has several dependent files associated with it, file filter driver 110 may recognize it as a file that should be continuously monitored. In some aspects, file filter driver 110 may determine whether the size of a file exceeds a predetermined minimum size (e.g., 500 MB). In response to determining that at least one of the criteria described above is satisfied, file filter driver 110 determines that the file should be continuously monitored.

In some aspects, the identification of files that should be monitored is performed prior to performing the full image backup 106 such that file filter driver 110 generates a predefined files list 112 based on the file selection rules. The predefined files list 112 may list identifiers and locations of files that should be continuously monitored on storage device 102. Thus, file filter driver 110 may simply refer to predefined files list 112 to determine whether to monitor a file (saving time and hardware resources). In some aspects, a user may manually indicate the files that he/she would like monitored.

Consider an example where the plurality of files 104 comprises files 1-10. Predefined files list 112 may indicate that files 1, 2, and 3 should be monitored. Subsequent to performing a full image backup 106 at time T1, file filter driver 110 may detect that file 1 has exited a full consistency state at time T2. A full consistency state represents a state of a file when it has remained unmodified and has not been accessed for a given period of time (e.g., 30 seconds). In some aspects, the full consistency state represents a state of a file in which an opened file has been saved (either manually or automatically) and remains unmodified subsequently for a given period of time (e.g., 10 seconds). In this case, modification and access may be performed by a user or a service. In the example provided, file 1 may exit the full consistency state if it has been opened for read operations and/or is being modified (i.e., write operations). In response to the detection, file filter driver 110 may monitor file 1 to detect a return to the full consistency state. In response to detecting that file 1 has returned to the full consistency state at time T3, file filter driver 110 may identify a physical address of at least one sector comprising file 1 on the storage device 102. File filter driver 110 may then update, in the most recently captured image backup (e.g., backup 106), a version of file 1 previously captured in the image backup with a version of file 1 after returning to the full consistency state (e.g., file 1*) by copying contents of the at least one sector to a corresponding physical address of the image backup 106. For example, as depicted in system 100, a first version of file 1 is crossed out in full image backup 106 and is replaced with another version of file 1.

Updating select files in an image backup is a continuous process. Suppose that files 4 and 7 were modified between time T1 and time T4. At time T4, image backup module 105 generates incremental image backup 108 comprising the modified versions of file 4 and file 7. At time T5, image backup module 105 may determine that file 2 has exited a full consistency state. Because file 2 is a part of predefined files list 112, file filter driver 110 instructs image backup module 105 to wait for file 2 to reenter the full consistency state (e.g., after a user/service saves file 2 and ceases access to file 2) and then upload the modified file 2 to incremental image backup 108. Thus, at time T6, image backup module 105 uploads a version of file 2 (e.g., file 2*) by copying contents of the at least one sector associated with file 2* to incremental image backup 108. It should be noted that although files 4 and 7 were also modified between time 1 and time 4, file filter driver 110 knows that those files are not included in predefined files list 112 and therefore does not instruct image backup module 105 to upload modified files 4 and 7 to full image backup 106.

As discussed, an image backup may be performed at a predetermined frequency. Full image backup 106 may have been performed at a first time. In some aspects, subsequent to performing the full image backup 106, image backup module 105 may perform another image backup (e.g., incremental image backup 108) at a second time in accordance with the predetermined frequency. In response to determining that the file (e.g., file 1) has not returned to the full consistency state while performing the another image backup, file filter driver 110 may instruct image backup module 105 to not finalize the another image backup (where finalization means that new image backup cannot be written to storage device 102). Accordingly, subsequent image backups may also be halted by image backup module 105. File filter driver 110 may wait for the file to return to the full consistency state, and instruct image backup module 105 to finalize the another image backup by copying the contents of the at least one sector to the corresponding physical address of the image backup subsequent to the file returning to the full consistency state. In some aspects, all modifications to a monitored file are stored in the latest backup in the plurality of backups comprising full image backup 106 and incremental image backup 108. Because files are stored in parallel to regular image backups, the most relevant and consistent version of a file is retained (rather than outdated versions). In some aspects, each version of a given file is separately stored from the image backup for ease of access, but only the latest version is integrated into the image file generated by a backup.

In some cases, a file exits and reenters a full consistency state multiple times subsequent to an image backup and prior to another image backup. For example, file 1 may exit and enter a full consistency state three times between full image backup 106 and incremental image backup 108. Accordingly, each of the three versions of the file is updated in full image backup 106 and replaces a prior version of the file in full image backup 106 (e.g., version 1 is replaced by version 2, which is replaced by version 3). It should be noted that rather than generating multiple conventional incremental backups, only the previously generated image backup is updated. This is more efficient that generating multiple conventional incremental backups because incremental backups will also include other files on storage device 102 (rather than only files in predefined files list 112) that were modified since the previous image backup. As conventional incremental backups end up being larger in size, they require more processing to generate the backup and take more storage space cumulatively. This proves to be unnecessary when the user is only interested in the latest version of a file.

Continuing the example of versions of file 1, image backup module 105 may perform another image backup (e.g., image backup 108) of storage device 102. Image backup module 105 may determine whether a latest version of file 1 was created closer to image backup 106 or image backup 108, and in response to determining that the latest version of file 1 was created closer to image backup 108, image backup module 105 includes the latest version of file 1 in image backup 108. In some aspects, image backup module 105 may also revert the latest version of file 1 in image backup 106 to the version of the file previously captured in image backup 106.

For example, suppose that at T1 full image backup 106 comprises a first version of file 1. At T3, a new version of file 1 is created (e.g., file 1*). Accordingly, image backup module 105 saves file 1* in image backup 106. This ensures that if computing device 101 fails between T3 and T4 (i.e., the next image backup), file 1* is not lost. However, once incremental image backup 108 is generated, image backup module 105 determines whether to include file 1* in image backup 108. In some aspects, because image backup 108 represents changes on computing device 101 between T1 and T4 and file 1* was generated between this time period, image backup module 105 includes file 1* in image backup 108. In addition, image backup module 105 may restore the initial version of file 1 in image backup 106. In this case, the initial version may not be replaced in image backup 106. Instead, a copy of the latest version may simply be included in image backup 106.

In some aspects, image backup module 105 determines the midpoint between image backup 106 and 108 (e.g., (T1+T4)/2) and determines whether the time that the latest version of file 1 was created (i.e., T3) is before or after the midpoint. If the version is generated before the midpoint, the version is included in image backup 106. If the version is generated after the midpoint, image backup module 105 includes the version in image backup 108.

Figure 2:
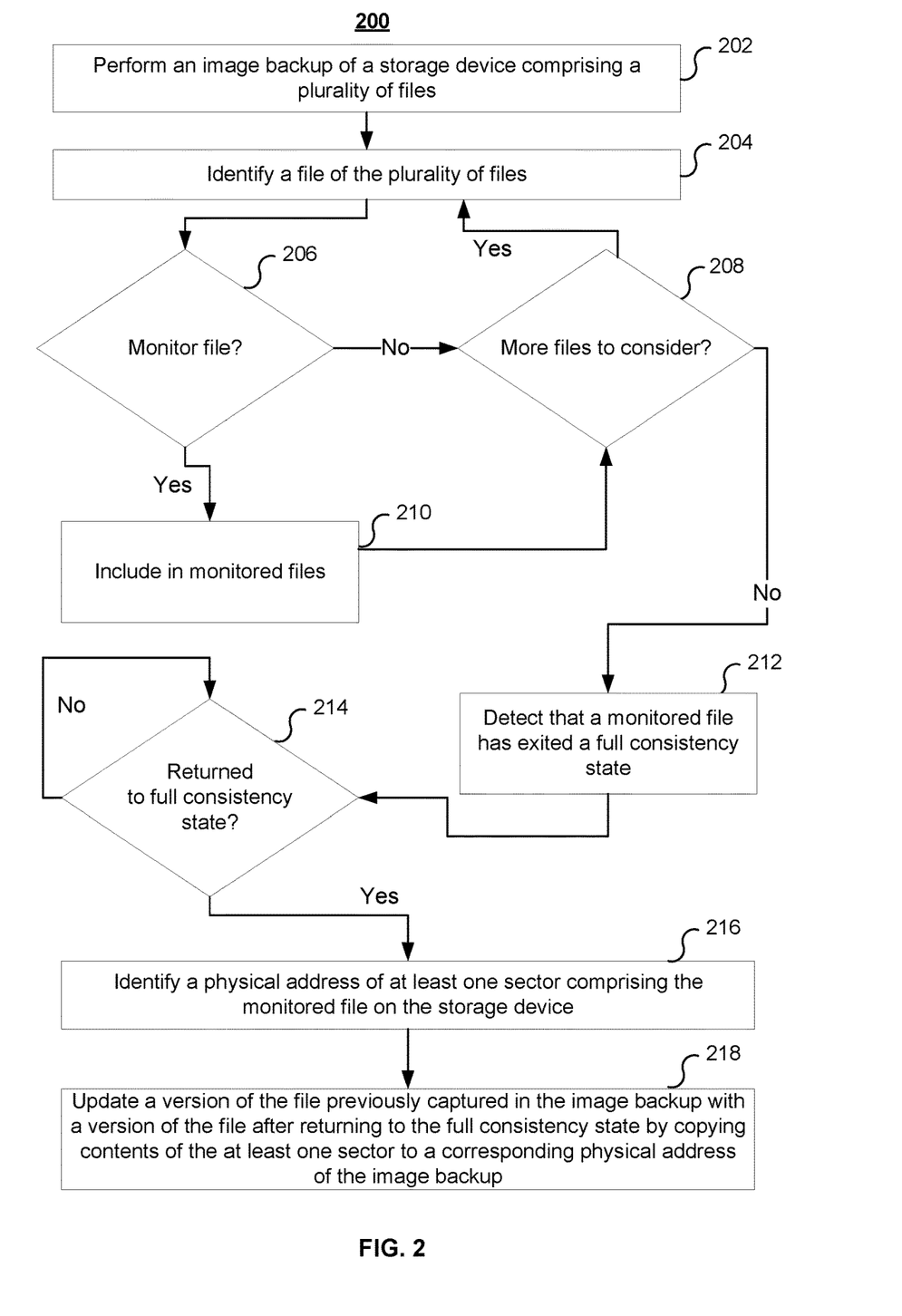
FIG. 2 illustrates a flow diagram of a method for updating select files in an image backup, in accordance with aspects of the present disclosure.

FIG. 2 illustrates a flow diagram of method 200 for updating select files in an image backup, in accordance with aspects of the present disclosure. At 202, image backup module 105 performs an image backup of a storage device comprising a plurality of files 104. At 204, file filter driver 110 identifies a file of the plurality of files 104 (e.g., file 1). At 206, file filter driver 110 determines whether to monitor the file. For example, file filter driver 110 may refer to the predefined files list 112 to determine whether file 1 is in the list. In response to determining that the file should be monitored, method 200 proceeds to 210, where file filter driver 110 includes the file in a list of monitored files. If at 206 file filter driver 110 determines that the file should not be monitored, method 200 proceeds to 208.

At 208, file filter driver 110 determines whether there are more files to consider in the plurality of files 104. For example, the plurality of files 104 may comprise files 1-10. After considering file 1, file filter driver 110 may consider each and every file in consecutive order until file 10 (e.g., method 200 will loop between 204 and 208). If at 208 file filter driver 110 determines that there are no more files to consider (i.e., the list of monitored files has been fully generated), method 200 proceeds to 212. At 212, file filter driver 110 detects that at least one of the monitored files has exited a full consistency state. At 214, file filter driver 110 determines whether the at least one of the monitored files has returned to full consistency state. If not, method 200 remains at 214. If the at least one of the monitored files has returned to full consistency state, method 200 proceeds to 216, where file filter driver 110 identifies a physical address of at least one sector comprising the at least one of the monitored files on the storage device. Method 200 then ends at 218, where file filter driver 110 updates a version of the file previously captured in the image backup with a version of the file after returning to the full consistency state by copying contents of the at least one sector to a corresponding physical address of the image backup.

Figure 3:
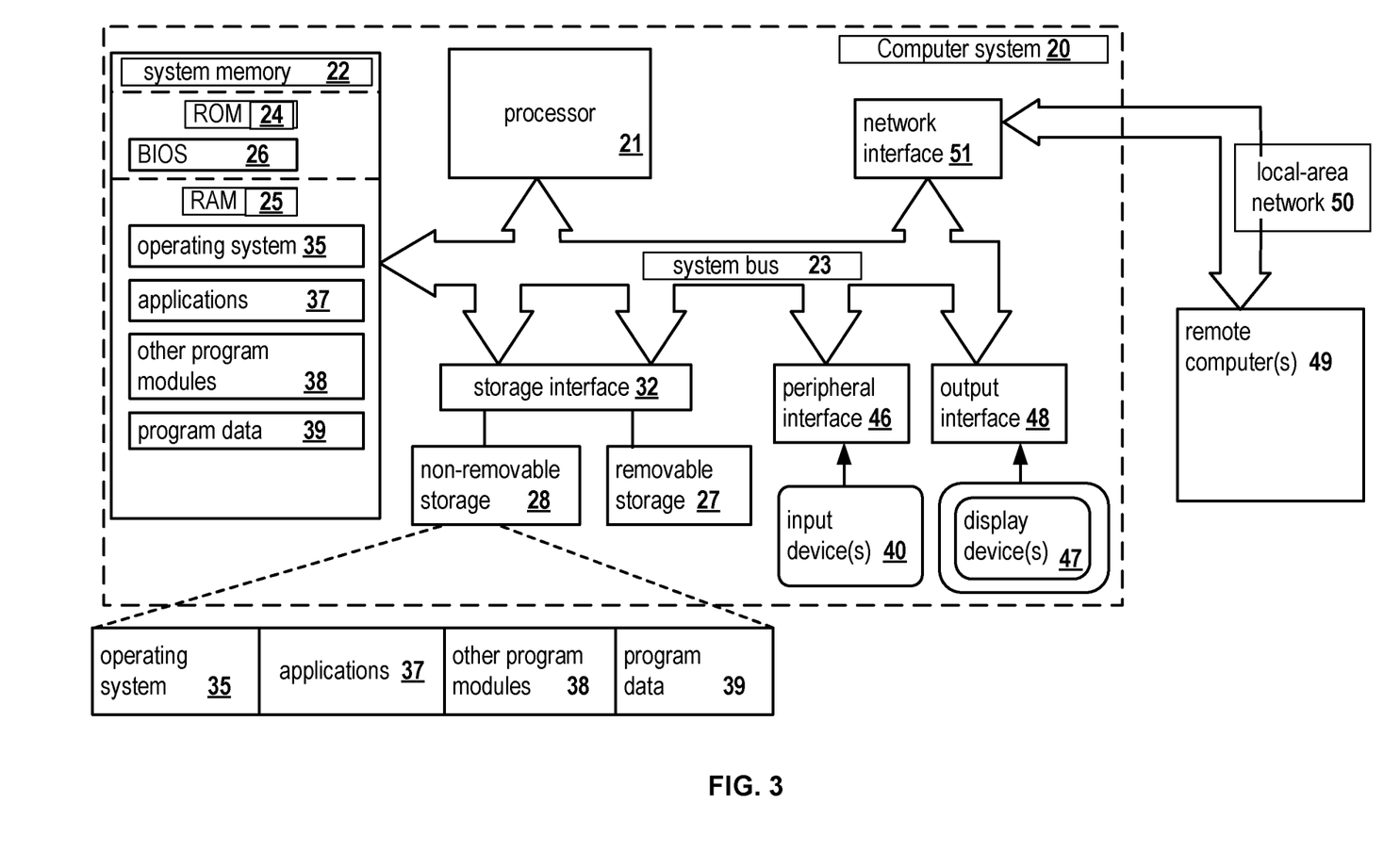
FIG. 3 presents an example of a general-purpose computer system on which aspects of the present disclosure can be implemented.

FIG. 3 is a block diagram illustrating a computer system 20 on which aspects of systems and methods for updating select files in an image backup may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-2 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for updating select files in an image backup, the method comprising:

performing an image backup of a storage device comprising a plurality of files;

selecting a file of the plurality of files based on file selection rules;

subsequent to the image backup, detecting that the file has exited a full consistency state, wherein the full consistency state is a state in which the file has remained unmodified for a given period of time;

monitoring the file to detect a return to the full consistency state, wherein detecting the return to the full consistency state comprises determining that the file has remained unmodified for the given period of time since exiting the full consistency state;

in response to detecting that the file has returned to the full consistency state, identifying a physical address of at least one sector comprising the file on the storage device;

updating a version of the file previously captured in the image backup with a latest version of the file after returning to the full consistency state by copying contents of the at least one sector to a corresponding physical address of the image backup;

performing another image backup of the storage device; and in response to determining that the latest version of the file was created closer to the another image backup, including the latest version of the file in the another image backup and reverting the latest version of the file in the image backup to the version of the file previously captured in the image backup.

2. The method of claim 1, wherein the image backup is either a full image backup or an incremental image backup.

3. The method of claim 1, wherein the image backup is performed at a predetermined frequency, and wherein the image backup was performed at a first time, further comprising:
- subsequent to performing the image backup, performing an additional image backup at a second time in accordance with the predetermined frequency; and
- in response to determining that the file has not returned to the full consistency state while performing the additional image backup:
- not finalizing the additional image backup;
- waiting for the file to return to the full consistency state; and
- finalizing the additional image backup by copying the contents of the at least one sector to the corresponding physical address of the image backup subsequent to the file returning to the full consistency state.

4. The method of claim 1, wherein monitoring the file to detect the return to the full consistency state further comprises halting subsequent image backups.

5. The method of claim 1, wherein the file selection rules indicate a set of criteria comprising at least one of:
- (1) a minimum file size,
- (2) a minimum number of access counts,
- (3) a minimum number of dependencies, and
- (4) a minimum number of state switches associated with a respective file that is to be selected.

6. The method of claim 1, wherein the file exits and reenters the full consistency state multiple times subsequent to the image backup and prior to the another image backup, wherein each version of the file is updated in the image backup and replaces a prior version of the file in the image backup.

7. The method of claim 6,
wherein the another image backup comprises a subset of the plurality of files.

8. A system for updating select files in an image backup, the system comprising:
- a hardware processor configured to:
- perform an image backup of a storage device comprising a plurality of files;
- select a file of the plurality of files based on file selection rules;
- subsequent to the image backup, detect that the file has exited a full consistency state, wherein the full consistency state is a state in which the file has remained unmodified for a given period of time;
- monitor the file to detect a return to the full consistency state, wherein detecting the return to the full consistency state comprises determining that the file has remained unmodified for the given period of time since exiting the full consistency state;
- in response to detecting that the file has returned to the full consistency state, identify a physical address of at least one sector comprising the file on the storage device; and
- update a version of the file previously captured in the image backup with a latest version of the file after returning to the full consistency state by copying contents of the at least one sector to a corresponding physical address of the image backup;
- perform another image backup of the storage device; and
- in response to determining that the latest version of the file was created closer to the another image backup, include the latest version of the file in the another image backup and revert the latest version of the file in the image backup to the version of the file previously captured in the image backup.

9. The system of claim 8, wherein the image backup is either a full image backup or an incremental image backup.

10. The system of claim 8, wherein the image backup is performed at a predetermined frequency, and wherein the image backup was performed at a first time, wherein the hardware processor is configured to:
- subsequent to performing the image backup, perform an additional another image backup at a second time in accordance with the predetermined frequency; and
- in response to determining that the file has not returned to the full consistency state while performing the additional another image backup:
- not finalize the additional another image backup;
- wait for the file to return to the full consistency state; and
- finalize the additional another image backup by copying the contents of the at least one sector to the corresponding physical address of the image backup subsequent to the file returning to the full consistency state.

11. The system of claim 8, wherein the hardware processor is further configured to monitor the file to detect the return to the full consistency state and halt subsequent image backups.

12. The system of claim 8, wherein the file selection rules indicate a set of criteria comprising at least one of:
- (1) a minimum file size,
- (2) a minimum number of access counts,
- (3) a minimum number of dependencies, and
- (4) a minimum number of state switches associated with a respective file that is to be selected.

13. The system of claim 8, wherein the file exits and reenters the full consistency state multiple times subsequent to the image backup and prior to the another image backup, wherein each version of the file is updated in the image backup and replaces a prior version of the file in the image backup.

14. The system of claim 13,
wherein the image backup comprises a subset of the plurality of files.

15. A non-transitory computer readable medium storing thereon computer executable instructions for updating select files in an image backup, including instructions for:
- performing an image backup of a storage device comprising a plurality of files;
- selecting a file of the plurality of files based on file selection rules;
- subsequent to the image backup, detecting that the file has exited a full consistency state, wherein the full consistency state is a state in which the file has remained unmodified for a given period of time;
- monitoring the file to detect a return to the full consistency state, wherein detecting the return to the full consistency state comprises determining that the file has remained unmodified for the given period of time since exiting the full consistency state;
- in response to detecting that the file has returned to the full consistency state, identifying a physical address of at least one sector comprising the file on the storage device; and
- updating a version of the file previously captured in the image backup with a latest version of the file after returning to the full consistency state by copying contents of the at least one sector to a corresponding physical address of the image backup;

performing another image backup of the storage device; and in response to determining that the latest version of the file was created closer to the image backup, including the latest version of the file in the another image backup and reverting the latest version of the file in the image backup to the version of the file previously captured in the image backup.

16. The non-transitory computer readable medium of claim 15, wherein the image backup is either a full image backup or an incremental image backup.

17. The non-transitory computer readable medium of claim 15, wherein the image backup is performed at a predetermined frequency, and wherein the image backup was performed at a first time, further comprising instructions for:

subsequent to performing the image backup, performing an additional image backup at a second time in accordance with the predetermined frequency; and in response to determining that the file has not returned to the full consistency state while performing the additional image backup:

not finalizing the additional image backup;

waiting for the file to return to the full consistency state; and finalizing the additional image backup by copying the contents of the at least one sector to the corresponding physical address of the image backup subsequent to the file returning to the full consistency state.

18. The non-transitory computer readable medium of claim 15, wherein instructions for monitoring the file to detect the return to the full consistency state further comprises instructions for halting subsequent image backups.

\* \* \* \* \*